United States Patent [19]

Davey

[11] Patent Number: 4,762,544
[45] Date of Patent: Aug. 9, 1988

[54] AUTOMATED CONTROL OF GLASS CONTAINER MANUFACTURE

[75] Inventor: Richard G. Davey, Toledo, Ohio
[73] Assignee: Owens-Illinois Glass Container Inc., Toledo, Ohio
[21] Appl. No.: 257
[22] Filed: Jan. 2, 1987
[51] Int. Cl.[4] .............................................. B07C 5/34
[52] U.S. Cl. ........................................ 65/29; 65/158; 65/162; 65/163; 65/164; 209/523; 209/525; 209/526; 209/583
[58] Field of Search ................... 65/29, 158, 162, 163, 65/164; 209/523, 525, 526, 583

[56] References Cited

U.S. PATENT DOCUMENTS

4,413,738  11/1983  Pemberton et al. ............ 209/583 X
4,457,772  7/1984  Haynes et al. ...................... 65/29 X

*Primary Examiner*—Arthur Kellogg

[57] ABSTRACT

A glassware production system includes an electropneumatic individual section glass forming machine having a multiplicity of operating mechanisms for converting a gob of molten glass into a hollow glass container. A glass forehearth feeds molten gobs at controlled temperature and weight to the forming machine. Electronic controllers individually and selectively control parameters of operation of the multiplicity of machine mechanisms and the forehearth. Glassware from the forming machine is inspected for manufacturing faults and for identifying each inspected container with its associated mold of origin. The glassware inspection devices provide fault signals indicative of a plurality of differing types of faults, which are thereafter associated not only with mold or section of origin but also with fault cause. The differing types of fault signals are thus coordinated with associated operating parameters of the forming machine and forehearth, and such operating parameters are automatically varied at the machine and forehearth controllers to correct detected faults.

8 Claims, 8 Drawing Sheets

TEAR ON NECK

FIG. 5I

BENT NECKS

FIG. 5J

CHECKED SHOULDER

FIG. 5K

DOWN SHOULDERS

FIG. 5L

OUT OF SHAPE OR LEANER

FIG. 5M

PRESSURE OR HOT CHECKS

FIG. 5N

SUNKEN SIDES

FIG. 5-O

CHECKED BOTTOM

FIG. 5P

SLUG BOTTOM

FIG. 5Q

FIG.5A — SPLIT FINISH

FIG.5B — CHOKED NECKS

FIG.5C — CHECKED BASE

FIG.5D — CHECKED FINISH

FIG.5E — BULGED FINISH

FIG.5F — UNFILLED FINISH

FIG.5G — OVERPRES ON FINISH

FIG.5H — OUT OF ROUND FINISH

FIG. 4

AUTOMATED CONTROL OF GLASS CONTAINER MANUFACTURE

The present invention is directed to glassware production systems, and more particularly to automated control of the glassware manufacturing process for elimination of manufacturing defects.

BACKGROUND OF THE INVENTION

The art of glass container manufacture is currently dominated by the so-called individual section or IS machine. Such machines comprise a plurality of separate or individual manufacturing sections, each of which include a multiplicity of operating mechanisms for converting a charge or gob of molten glass into a hollow glass container. In general, each section includes a parison mold in which a glass gob is initially formed in a blowing or pressing operation, an invert arm for transferring the parison to a blow mold in which the container is blown to final form, and tongs for removing the container for transfer to an annealing lehr. Additional mechanisms provide for closure of the mold halves, movement of baffles and blowing nozzles, control of mold cooling wind, etc. U.S. Pat. No. 4,362,544 includes a comprehensive background discussion of the art of both "blow and blow" and "press and blow" glassware forming processes, and also discloses an electropneumatic individual section machine adapted for use in either process.

The art of inspecting glassware for manufacturing faults is also well developed. U.S. Pat. No. 4,413,738 discloses a system in which each container is routed through one of a plurality of multistation inspection devices for automated optical inspection for sidewall and finish faults. Each container has integrally molded indicia which uniquely identifies the mold of container origin, and a finished product computer receives fault signals and correlates faults with defective molds or malfunctioning machine sections. U.S. application Ser. No. 769,527, filed Aug. 26, 1985, now U.S. Pat. No. 4,691,830 and assigned to the assignee hereof, discloses an automated system for inspection and sorting of molded containers such as glass bottles as a function of mold cavity of container origin. Container fault signals are correlated with forming machine sections and molds, and fault information is fed to the mold operators for implementation of corrections.

U.S. Pat. Nos. 4,152,134 and 4,369,052 disclose computer-based systems for controlling operation of glassware forming machines. In U.S. Pat. No. 4,152,134, each individual section of an IS machine is coupled to an individual section computer, and a multiplicity of individual section computers are coupled to a machine supervisory computer-for downloading control programming. In U.S. Pat. No. 4,369,052, a multiplicity of machine supervisory computers are coupled to a forming supervisory computer for enhanced overall control, and for storage and reporting of defect information. The disclosed systems include facility for operator adjustment of mechanism timing in the various forming sections. Pressure control, however, remains difficult to implement. Thus, the art has yet to implement a fully automated glassware manufacturing system wherein all parameters of the glassware manufacturing process are automatically controlled for correction of detected faults.

OBJECTS AND SUMMARY OF THE INVENTION

It is therefore a general object of the present invention to provide a completely automated glassware production system of the described character which includes facility for automated control of glassware forming parameters, including timing, pressure and/or temperature parameters, for continuous closed-loop inspection control and correction of manufacturing faults in the resulting ware.

In accordance with the present invention, a glassware production system includes a glass forming machine having a multiplicity of operating mechanisms for converting a gob of molten glass into a hollow glass container. Most preferably, the glass forming machine comprises an electropneumatic machine having a multiplicity of air-operated mechanisms and electropneumatic valves responsive to valve control signals from an electronic machine controller for connecting the pneumatic operating mechanisms to a source of pneumatic power. (Electrohydraulic and electric machines are also contemplated.) A glass forehearth and feeder feeds molten gobs at controlled temperature and weight to the forming machine. Electronic controllers individually and selectively control parameters of operation of the multiplicity of machine mechanisms and the forehearth. Most preferably, the glassware forming machines comprise a multiplicity of individual section machines, each including molds for forming ware containing integral indicia indicative of mold of origin.

Glassware from the forming machine or machines is inspected for manufacturing faults and for identifying each inspected container with its associated mold of origin. The glassware inspection devices provide fault signals indicative of a plurality of differing types of faults, which are thereafter associated not only with mold or section of origin but also with fault cause. The differing types of fault signals are thus coordinated with associated operating parameters of the forming machine and forehearth, and such operating parameters are automatically varied at the machine and forehearth controllers to correct detected faults.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
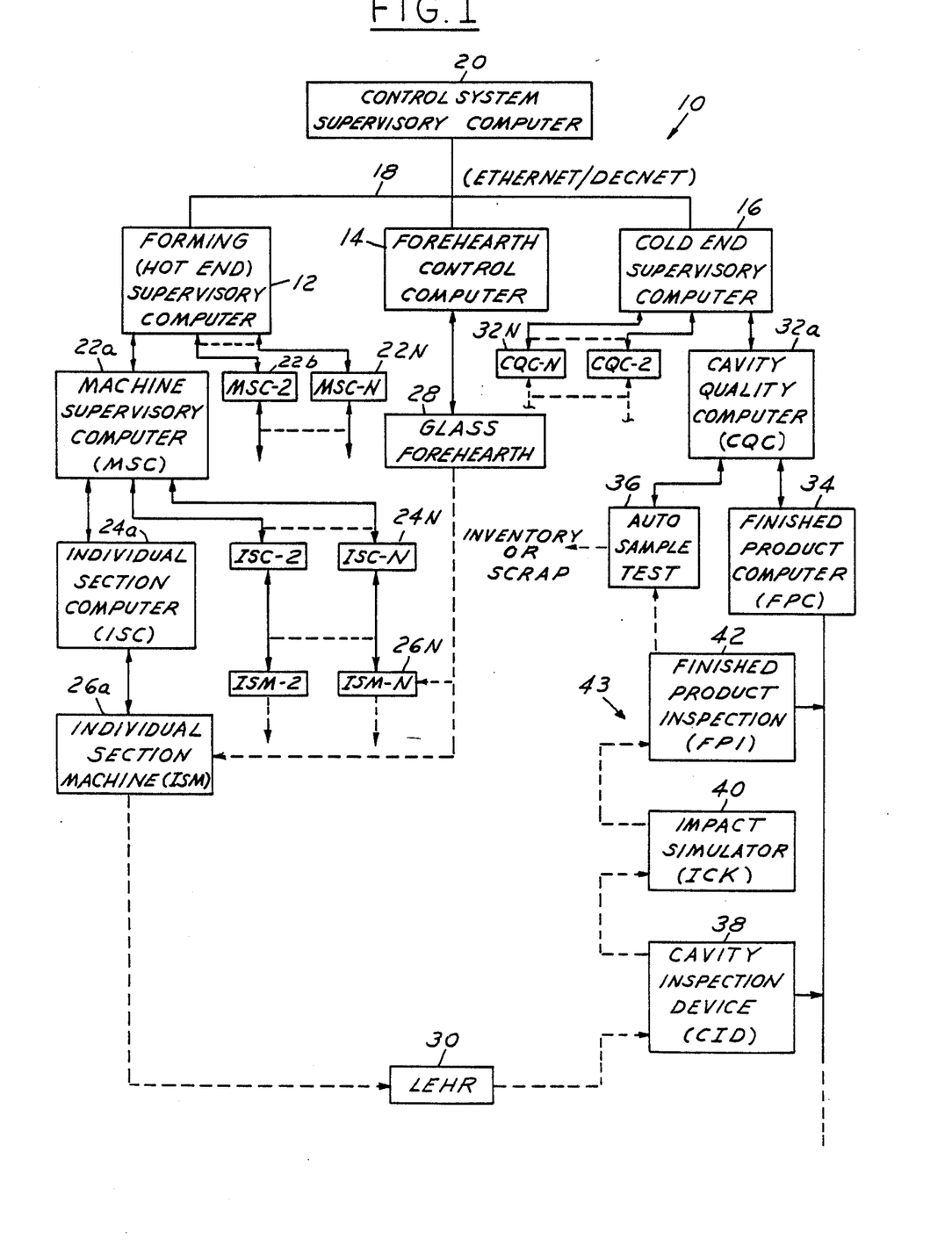
FIG. 1 is a fragmentary functional block diagram of a fully automated glassware production system in accordance with the present invention.

FIG. 1 illustrates a glassware production system 10 in accordance with a presently preferred embodiment of the invention as comprising a forming or hot end supervisory computer 12, a forehearth control computer 14 and a cold end supervisory computer 16 interconnected by an ethernet/decnet bus 18 to an overall control system or plant supervisory computer 20. The various supervisory computers preferably include facility for analysis and archival storage of production data, control interfacing with system operators, and analysis and reporting of production data to plant management personnel. Forming supervisory computer 12 is connected to one or more machine supervisory computers or MSC's 22A-22N each of which is connected to one or more individual section computers or ISC's 24a-24n. Each ISC 24a-24n is dedicated to control of an associated individual section machine or ISM 26a-26n. Forehearth control computer 14 is connected to and controls operation of a glassware forehearth 28 which receives refined glass (from a meter/refiner not shown) and feeds molten glass gobs at controlled temperature and volume (weight) to the various ISM's 26a-26n for formation into glass containers. IS machines 26a-26n feed formed containers to an annealing lehr 30.

Cold end supervisory computer 16 is connected to one or more of cavity quality control computers or CQC's 32a-32n. Each CQC 32a-32n is coupled to an automated glassware inspection line which includes a finished product computer or FPC 34 and an automated sample test section 36. Glassware from lehr 30 is fed to a cavity inspection device or CID 38 which reads the integral indicia on each container in turn and thereby associates that container with its mold cavity of origin. Information correlating mold cavity number with ISM is stored in supervisory computer 12 or 20, so identification of cavity of origin also identifies machine section of origin. The containers so identified are then fed to an impact simulator or ICK 40 for testing the containers for structural faults, principally sidewall faults, by applying pressure to a portion of the circumference of the container sidewalls. The containers are then fed to and through a multiple station finished product inspection device or FPI 42 wherein the containers are inspected for sidewall and finish faults, diameter and height variations, eccentricity, etc. Glassware is then fed to section 36 wherein ware is sampled, either at random or by mold cavity identification, for volume testing, pressure testing, etc. Most preferably, the inspection line 43 connected to FPC 34 includes a plurality of ICK's 40 and FPI's 42 in a plurality of inspection loops which randomly receive finished ware from lehr 30. At least the primary inspection loop includes a CID 38. Where such multiple loops are employed, an additional CID 38 is provided at auto sample test section 36 for selection of sample containers.

Figure 2:
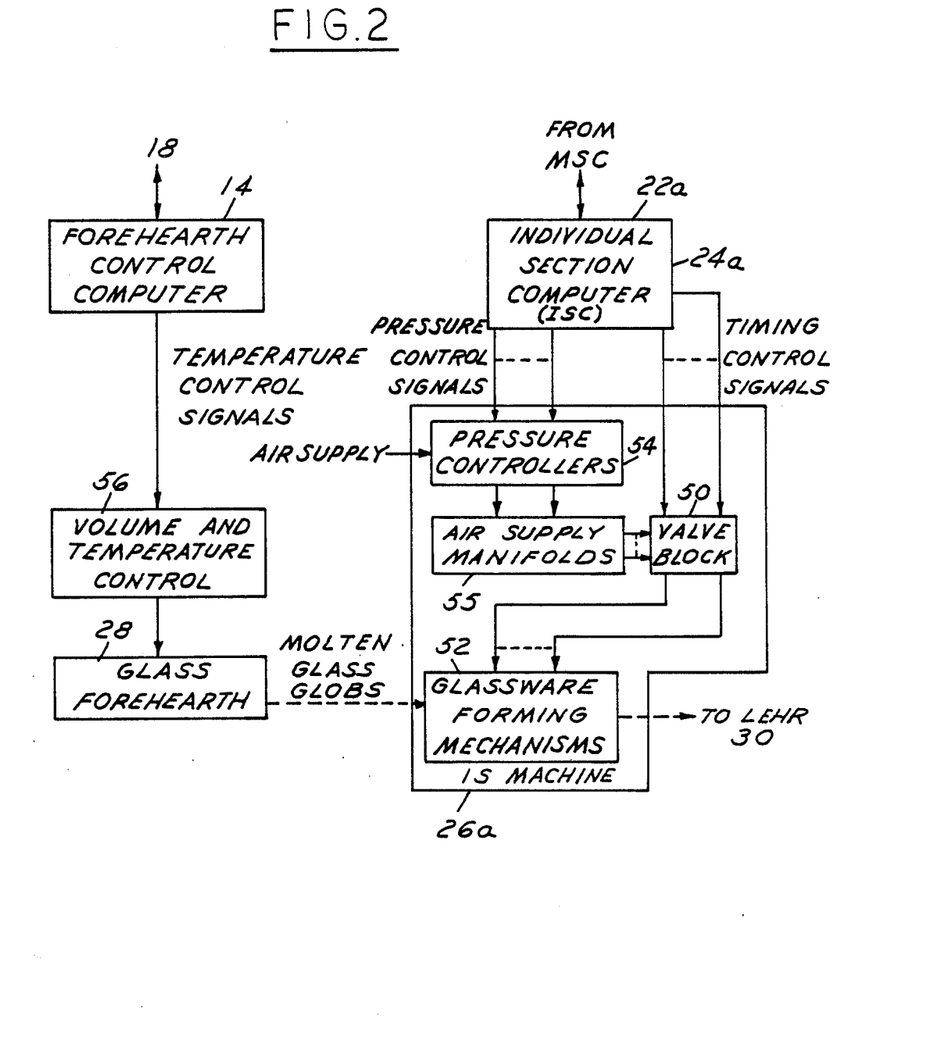
FIG. 2 is a fragmentary functional block diagram which illustrates details of control of the glassware forming mechanisms in the overall system of FIG. 1.

FIG. 2 illustrates control of glass forehearth 28 and IS machine 26a in greater detail. IS machine 26a includes a valve block assembly 50, which preferably comprises a multiplicity of solenoid and pneumatic valve pairs responsive to timing control signals from ISC 24a for individually and selectively connecting the various pneumatically driven operating mechanisms 52 of IS machine 26a to an air supply. A plurality of electropneumatic pressure regulators or controllers 54 are coupled between the air supply and the air supply manifolder 55 for individually controlling pressure of air applied to the various operating mechanisms 52 through the valve block 50. Manifolds 55 cooperate with mechanisms 52 for controlling such parameters as settle blow, counter blow, final blow, plunger pressing pressure, mold vacuum, blank vacuum, mold cooling air and blank cooling air. Forehearth control computer 14 is coupled through a glass gob volume (weight) and temperature control 56 to glass forehearth 28 for controlling weight and temperature of the molten glass gobs.

Figure 4:
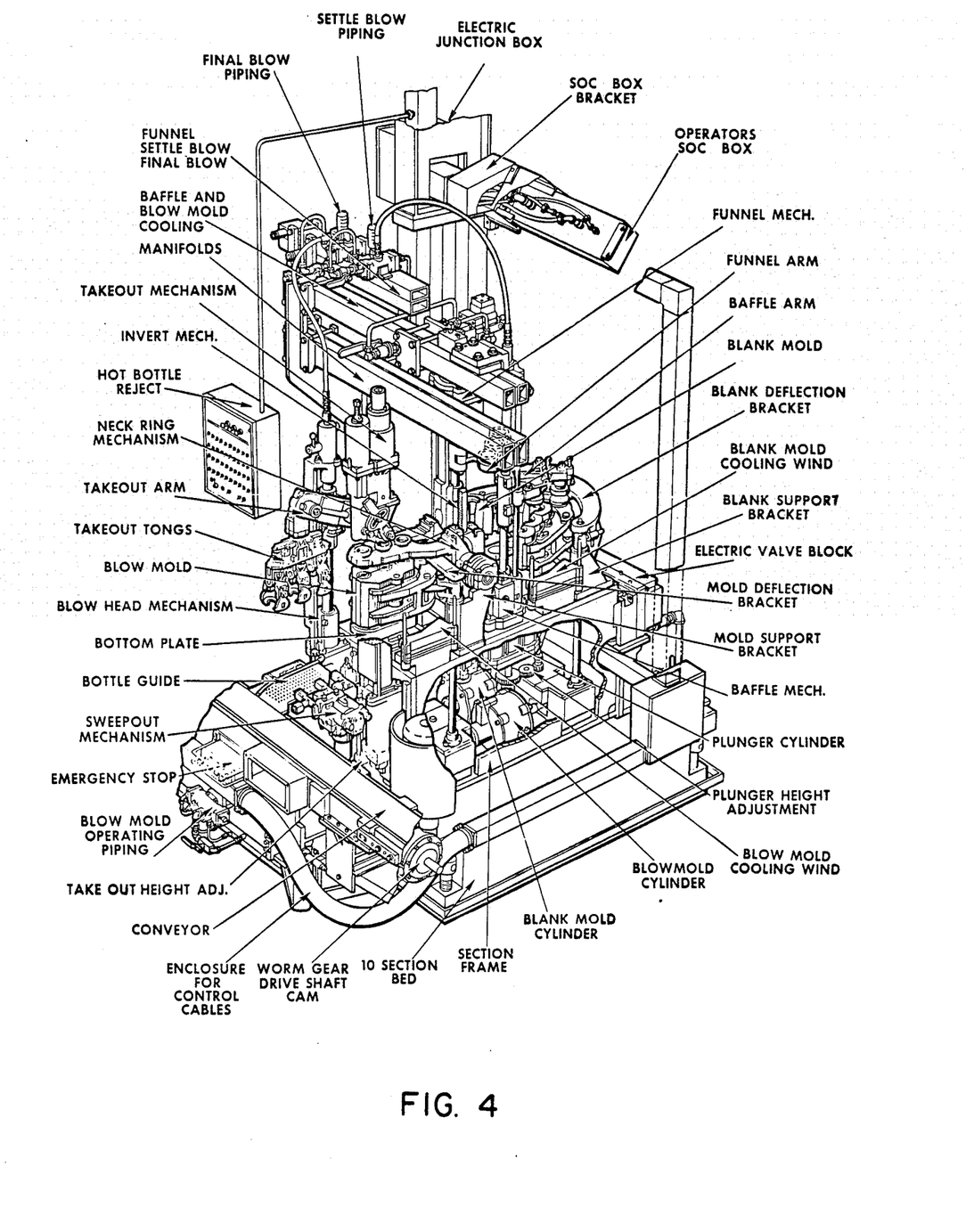
FIG. 4 is a perspective view which illustrates the major operating mechanisms of a single section of a triple-gob IS glass container forming machine which is set up to operate in accordance with a conventional "blow and blow" process.

Individual elements and groups of elements illustrated in functional block form in FIGS. 1 and 2, are of conventional construction well known in the art. For example, FIG. 4 illustrates the major operating mechanisms of a single section of an IS machine which is described in greater detail in U.S. Pat. No. 4,362,544 noted above. Such machine includes an electropneumatic valve block assembly 50 (FIG. 2) and is constructed to perform both "blow and blow" and "press and blow" manufacturing processes in differing modes of operation. U.S. Pat. No. 4,266,961 discloses, particularly in connection with FIG. 4 thereof, conventional "blow and blow" manufacturing processes and associated manufacturing parameters. U.S. Pat. No. 4,427,431 discloses a glassware forming machine which embodies all-electric operation of the forming mechanisms. U.S. Pat. Nos. 3,445,218 and 4,137,061 show electrohydraulic IS machines. Electropneumatic control is presently preferred. U.S. Pat. Nos. 3,918,489, 4,100,937 and 4,615,722 disclose conventional valve block assemblies 50. Pressure controllers 54 (FIG. 2) may be of any suitable type.

U.S. Pat. Nos. 4,152,134 and 4,369,052 disclose computer-implemented systems for controlling operation of one or more IS machine sections through dedicated IS computers or ISC's, MSC's coupled to a plurality of ISC's, and a common forming or hot end supervisory computer coupled to the MSC's. The disclosed systems include facility for preprogrammed control of machine operation and operator variation of mechanism timing parameters. U.S. Pat. No. 4,162,909 discloses IS machine controllers which include facility for detection and distribution of glass gobs. U.S. Pat. No. 4,375,669 discloses an IS machine controller which includes facility for controlling machine parameters as a function of glass gob characteristics measured in the forehearth. U.S. Pat. No. 4,389,725 discloses electronics for automated control of glass gob forehearth temperature.

Multistation finished product inspection devices or FPI's 42 are disclosed in U.S. Pat. Nos. 3,313,409 and 3,757,940. Supplemental thereto, U.S. application Ser. No. 424,687 filed Sept. 27, 1982 U.S. Pat. No. 4,487,322 and Ser. No. 602,862 filed Apr. 23, 1984, U.S. Pat. No. 4,601,395 disclose optical systems and methods for identifying sidewall defects in containers. U.S. application Ser. No. 473,285 filed Mar. 8, 1983, now abandoned and Ser. No. 756,539 filed July 19, 1985, U.S. Pat. No. 4,701,612 disclose systems and methods for optically inspecting the finish of glass containers. Other devices for inspecting the finish, shoulders, sidewalls and/or base of containers are disclosed in U.S. Pat. Nos. 3,160,760 and 4,209,387 (sidewall inspection); 3,188,743, 3,262,561, 3,313,409, 3,420,369, 3,880,750, 3,914,872, 4,278,173 and 4,424,441 (finish inspection); and 3,327,849, 4,378,493, 4,378,494, 4,433,785, and 4,608,709 (finish and sidewall inspection).

U.S. Pat. Nos. 4,175,236, 4,230,219 and 4,230,266 disclose cavity inspection devices or CID's 38 for reading imprinted cavity indicia as a function of rings molded into the bottoms of the containers. U.S. application Ser. No. 720,336 filed Apr. 5, 1985 U.S. Pat. No. 4,664,151 discloses a cavity inspection device wherein molds of origin of containers are identified by reading container codes manifested in a series of integrally molded bumps or protrusions which extend in an array around the container heel. The combination of FPC 34, CID 38 and a multiplicity of inspection loops 43 is disclosed in U.S. Pat. No. 4,413,738 noted above. U.S. application Ser. No. 769,527 filed Aug. 26, 1985, U.S. Pat. No. 4,691,830 discloses a complete cold end supervisory system which includes cold end supervisory computer 16, CQC's 32a–32n, FPC 34 coupled to a multiplicity of FPI's 42 in a plurality of inspection loops 43, and an automatically controlled sample test station 36. Exemplary impact simulators or ICK's 40 are disclosed in U.S. Pat. No. 3,991,608. The disclosures of all patents and pending applications (assigned to the assignee hereof) noted hereinabove are incorporated by reference.

Figure 5A:
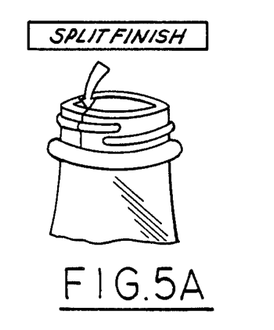
FIGS. 5A–5Q are respective schematic illustrations of various glassware manufacturing faults which are automatically controlled and corrected in accordance with a presently preferred embodiment of the invention.
Figure 5B:
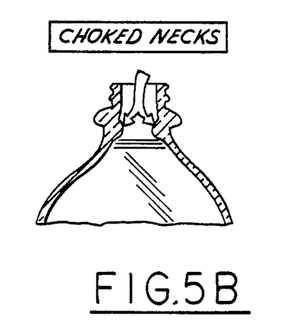
Figure 5C:
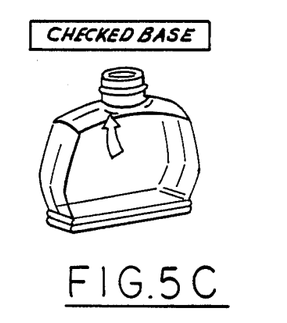

In accordance with the distinguishing feature of the present invention, faults in finished ware detected at the cold end inspection line are automatically correlated not only with section and mold cavity of origin, but also with operating parameters for adjustment to correct the faults in question. Further, and again in accordance with that feature of the present invention which distinguishes the same from the prior art noted by way of background hereinabove, correction is automatically implemented by selectively varying the forming parameter or parameters involved in a predetermined manner. FIGS. 5A—5Q illustrate various types of faults which may be detected and automatically corrected in accordance with the present invention. For example, FIG. 5A illustrates a split finish fault which, in a blow-and-blow process, may be corrected by incrementally reducing settle blow time within a single section if the fault is associated with only one section of a machine, or by incrementally reducing settle blow pressure in 0.5 p.s.i. increments, for example, if the fault appears in all sections of a given machine. In a press-and-blow process, the split finish fault may be corrected by reducing plunger pressing pressure in 0.25 p.s.i. increments. FIG. 5B illustrates a choked neck fault which mayappear in a blow-and-blow process and be corrected by reducing plunger contact time. FIG. 5C illustrates a checked base-fault which may be corrected in either a blow-and-blow or press-and-blow process by lowering final blow pressure in 0.5 p.s.i. increments.

Figure 5D:
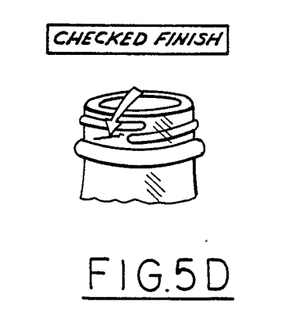
Figure 5E:
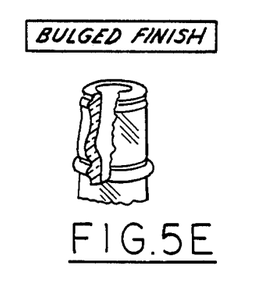
Figure 5F:
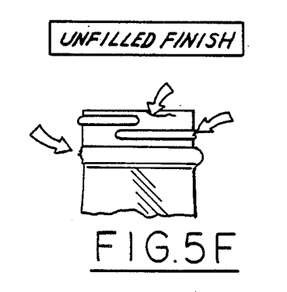
Figure 5G:
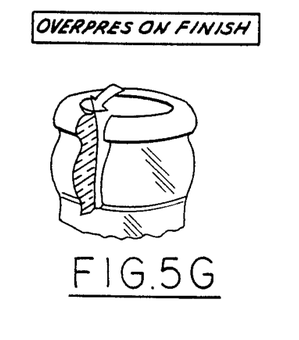

FIG. 5D illustrates a checked finish fault. In a blow-and-blow process, this fault may be corrected by adjusting the invert cushion pressure to reduce deceleration when only a single machine section is involved, or by incrementally reducing settle blow pressure where an entire machine exhibits this defect. In a press-and-blow process, and in addition to the corrective measures noted with reference with a blow-and-blow process, the glass spout temperature may be increased in 1° increments. FIG. 5E illustrates a buldged finish fault which may be corrected in a blow-and-blow process by increasing settle blow time. FIG. 5F illustrates an unfilled finish fault either at the sealing surface, thread or bead. This fault may be corrected in a blow-and-blow process by increasing settle blow time where only a single machine section is involved, or increasing settle blow pressure and/or spout glass temperature at the forehearth where an entire machine is involved. In a blow-and-blow process, plunger pressing pressure may be increased where a single machine section is involved, and glass gob weight and/or temperature may be increased wherein an entire machine is involved. FIG. 5G illustrates an overpress-on-finish fault, which may be corrected in a blow-and-blow process by bringing the plunger up sooner in a single machine section or delaying load of glass into the blank where an entire machine in involved. In a press-and-blow operation, this fault is corrected by reducing glass gob weight at the feeder/forehearth.

Figure 5H:
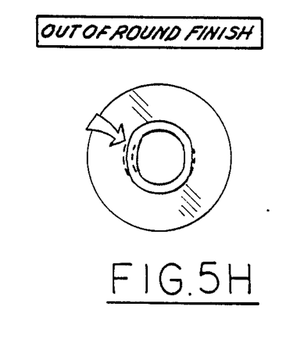
Figure 5I:
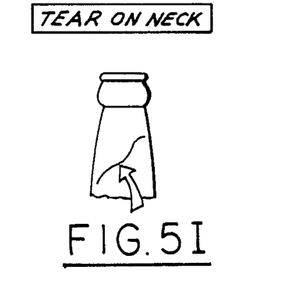
Figure 5J:
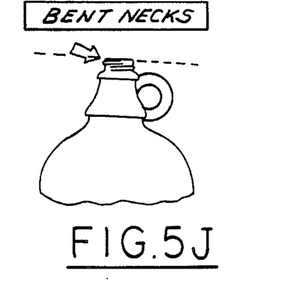
Figure 5K:
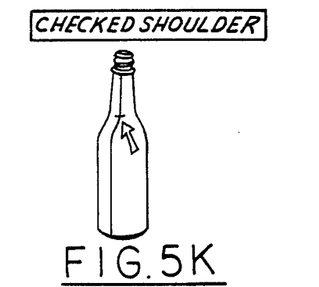
Figure 5L:
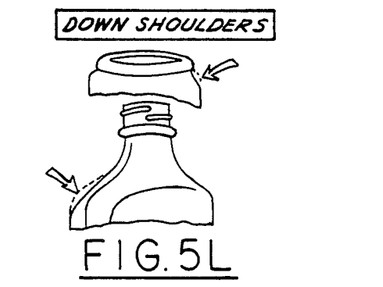

FIG. 5H illustrates a finish out-of-round fault which is corrective in a single section of a blow-and-blow process by increasing settle blow time and/or pressure, and is corrected in an entire blow-and-blow machine by reducing spout glass temperature at the forehearth in one degree increments, for example. In a single section of a press-and-blow operation, plunger dwell time may be incrementally increased, while for an entire press-and-blow machine, spout glass temperature may be lowered in 1° increments. FIG. 5I illustrates a neck tear fault which may be corrected in a single section of a blow-and-blow w machine by decreasing settle blow pressure in one p.s.i. increments and/or settle blow time in 1° increments (with reference to a 360° machine operating cycle). In a press-and-blow process, spout glass temperature can be increased in 1° increments and/or blank cooling wind volume may be decreased. A bent neck fault of the type illustrated in FIG. 5J may be corrected in a blow-and-blow single section by increasing blow time in 1° increments, or in an entire blow-and-blow machine by increasing settle blow pressure in 1 p.s.i. increments and/or reducing spout glass temperature in 1° increments. In a pressand-blow machine, the bent neck fault may be corrected by reducing spout glass temperature in 1° increments. FIG. 5K illustrates a checked shoulder fault which may be corrected in a blow-and-blow machine by lowering final blow pressure in 1 p.s.i. increments, and in a press-and-blow machine by lowering spout glass temperature in 1° increments and/or lowering final blow pressure in 1 p.s.i. increments. FIG. 5L illustrates a fault known as down shoulders in wide mouth or narrow neck containers. For either type of container, the fault may be corrected in a blow-and-blow machine by increasing final blow pressure in 1 p.s.i. increments, and in a press-and-blow process by increasing reheat time in 1° increments in a single section or increasing final blow pressure in 1 p.s.i. increments for the entire machine.

Figure 5M:
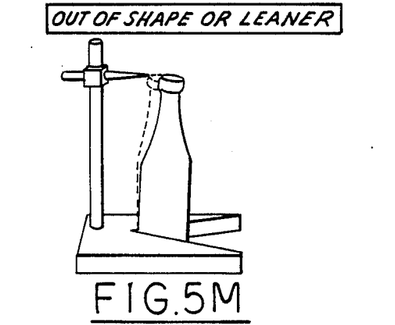
Figure 5N:
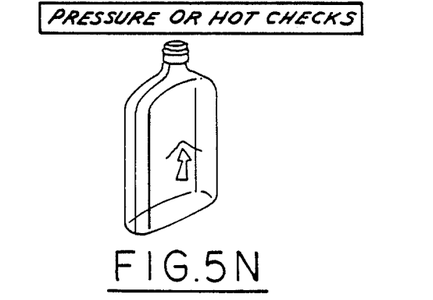
Figure 5O:
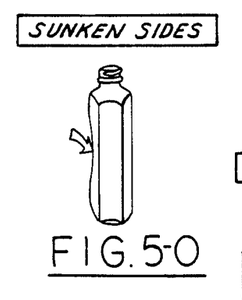
Figure 5P:
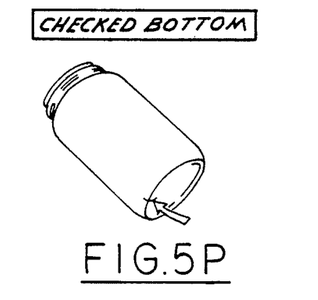
Figure 5Q:
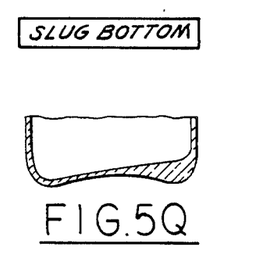

FIG. 5M illustrates a so-called leaner fault where the axis of the container finish is non-coincident with the axis of the container body. In a blow-and-blow process, this fault may be corrected by increasing final blow time in 1° increments for a single section, or by increasing blow mold cooling wind volume and/or increasing final blow pressure in 1 p.s.i. increments for the entire machine. In a press-and-blow process, final blow time may be increased in 1° increments and/or blow mold cooling wind volume may be increased within a single section, or final blow pressure may be increased in 1 p.s.i. increments for the entire machine. FIG. 5N illustrates a fault known as a pressure check or hot check, which may be corrected in a blow-and-blow process or a press-and-blow process by decreasing final blow time in 1° increments for a single section, or lowering final blow pressure in 1 p.s.i. increments for the entire machine. For a sunken side fault of the type illustrated in FIG. 5O, and in either a press-and-blow or blowand-blow process,- blow mold time may be increased in 1° increments within a single section, or final blow pressure may be increased in 1 p.s.i. increments for the entire machine. A checked bottom fault of the type illustrated in FIG. 5P may be corrected in either a press-and-blow and blow-and-blow operation by lowering final blow pressure in 1 p.s.i. increments. The so-called bottom slug fault illustrated in FIG. 5Q may be corrected in either a blow-and-blow or press-and-blow operation by selectively increasing or decreasing invert arm speed.

Figure 3A:
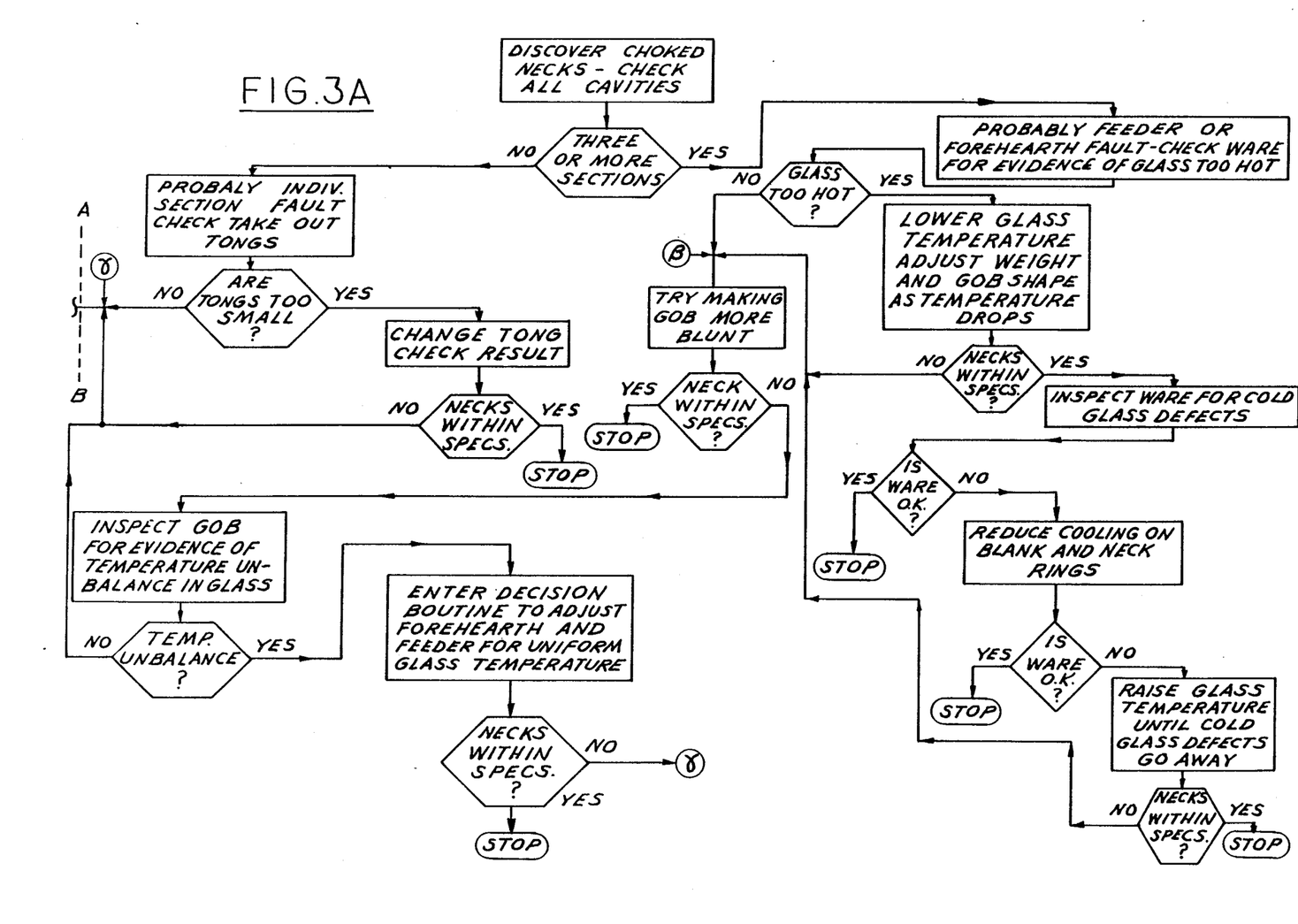
FIGS. 3A–3C collectively comprise a flowchart for correction of an exemplary glassware fault.
Figure 3B:
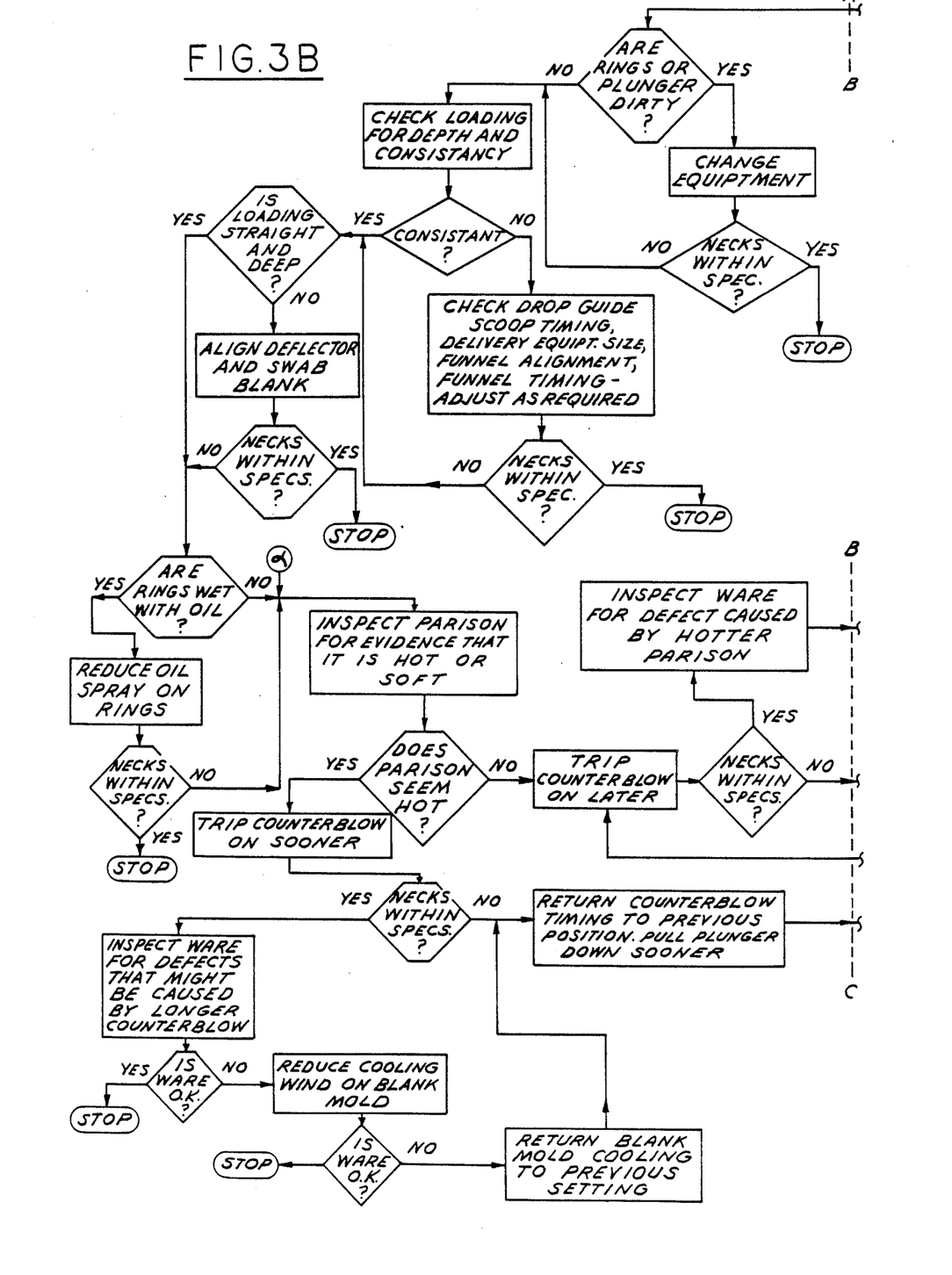
Figure 3C:
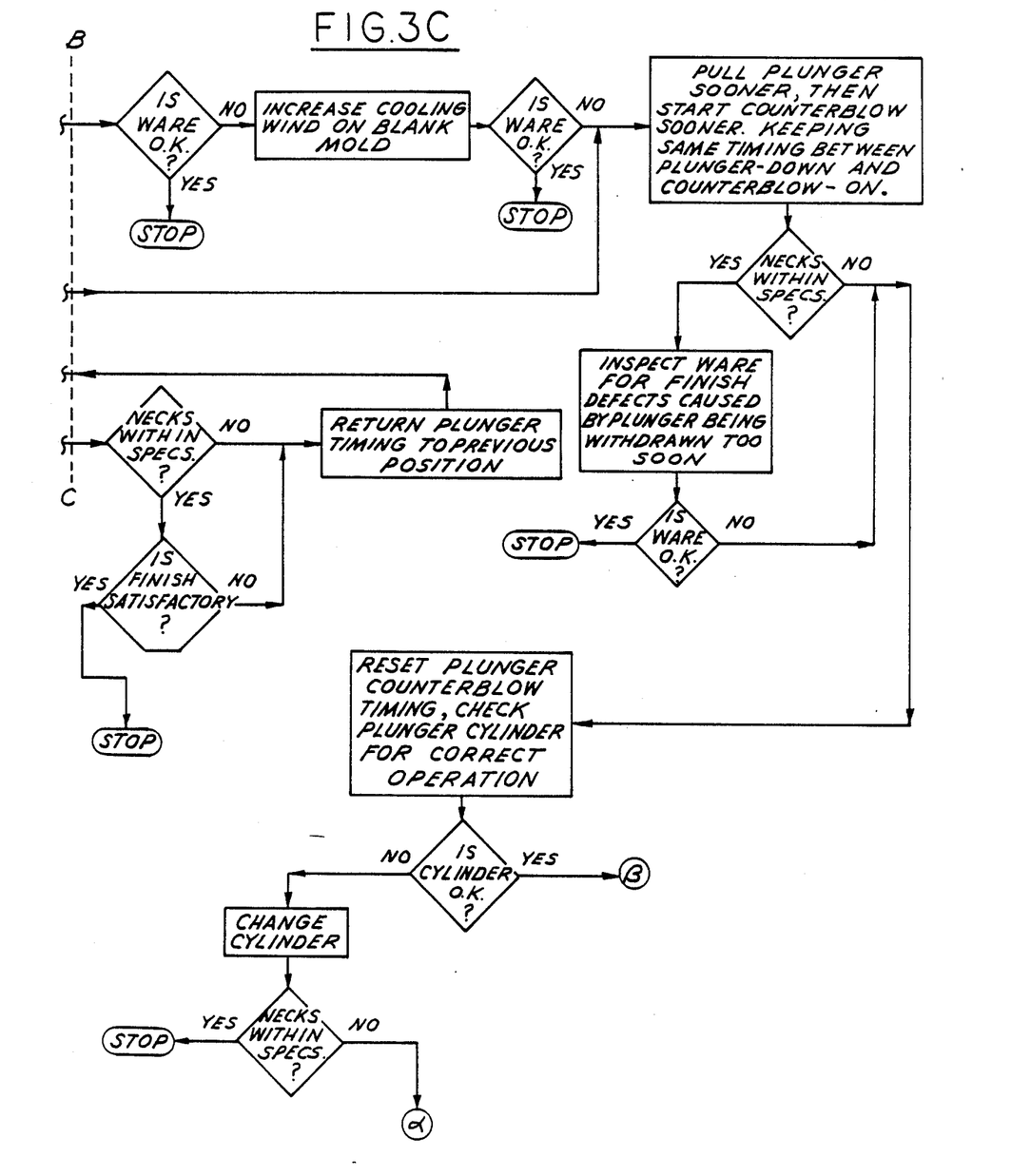

It will be appreciated, of course, that corrective measures of the type hereinabove described with reference to FIGS. 5A–5Q are carried out in an iterative process in which a correction increment is implemented at a machine or machine section upon detection of a fault or fault trend, and ware from the involved section or machine is thereafter inspected at the cold end of the process to monitor the effect of corrective measures. Additional or differing corrective measures may thereafter be implemented depending upon effect of incremental corrective measures previously taken. Incremental corrective measures previously suggested in connection with FIGS. 5A–5Q are, of course, exemplary. Likewise, the correction algorithm needed to implement correction for various faults, and for thereafter altering corrective measures depending upon results, are an empirical function of the production system involved, and will necessarily vary from system to system. FIGS. 3A–3C illustrate an algorithm or "decision tree" for correction of choked neck faults (FIG. 5B). Algorithms for iterative correction of other faults are of similar construction and may be readily empirically developed by persons of ordinary skill in the art. Such correction algorithms are stored in supervisory computer 12 or 22a.

The invention claimed is:

1. A method of operating a glass production system which includes a glass forming machine having a multiplicity of operating mechanisms for converting a gob of molten glass into a hollow glass container, a glass forehearth/feeder for feeding glass gobs at controlled temperature and volume to said forming machine, electronic control means for individually and selectively controlling parameters of operation of said multiplicity of machine mechanism and said forehearth, a lehr for annealing glass containers formed by said forming machine, and glassware inspection means for inspecting containers formed by said machine, said method comprising the steps of:
   (a) inspecting containers produced by said machine after annealing in said lehr for a plurality of faults at said inspection means,
   (b) producing fault signals at said inspection means indicative of differing types of faults detected at said inspection means,
   (c) coordinating said fault signals with associated operating parameters of said machine and said forehearth in accordance with predetermined analysis algorithms prestored in said electronic control means,
   (d) selectively automatically adjusting said operating parameters at said glass forming machine and said forehearth in accordance with said predetermined algorithms to correct said detected faults, and
   (e) following a delay sufficient to permit containers formed at said machine as a function of parameters adjusted in said step (d) to travel through said lehr, repeating said steps (a)–(d) such that said operating parameters are selectively iteratively adjusted in said step
   (d) in a manner and sequence predetermined by said algorithms to correct faults detected in said step (a).

2. The method set forth in claim 1 wherein said system includes a multiplicity of individual section glass forming machines each including a glass mold for forming glassware containing integral indicia identifying mold of origin, said method including the additional steps of:
   (f) reading said indicia at said inspection means, and
   (g) coordinating said fault signals with associated molds of origin and machine sections, and
   wherein said step (d) comprises the step of automatic controlling operating parameters through said electronic control means at said associated machine section.

3. The method set forth in claim 1 wherein said glass forming machine comprises an electropneumatic machine including a multiplicity of air-operated operating mechanisms and electropneumatic valve means responsive to valve control signals from said electronic control means for connecting said operating mechanisms to a source of pneumatic power, and wherein said step (d) comprises the steps of selectively controlling timing and duration of said valve control signals.

4. The method set forth in claim 3 wherein said glass forming machine further comprises a multiplicity of air pressure control means coupled between said source of pneumatic power and said operating mechanisms and responsive to pressure control signals from said electronic control means, and wherein said step (d) comprises the additional step of: selectively controlling said pressure control signals for controlling pressure of air applied to said operating mechanisms.

5. A glass production system which includes a glass forming machine having a multiplicity of operating mechanisms for converting a gob of molten glass into a hollow glass container, a glass forehearth for feeding glass gobs at controlled temperature and volume to said forming machine, electronic control means for individually and selectively controlling parameters of operation of said multiplicity of machine mechanisms and said forehearth, glassware inspection means for inspecting containers formed by said machine for a plurality of faults and producing fault signals indicative of differing types of faults detected at said inspection means, a lehr for annealing glass containers formed by said forming machine, and conveyor means for feeding containers formed by said machine through said lehr to said inspection means,
   said electronic control means including means for coordinating said fault signals with associated operating parameters of said machine and said forehearth in accordance with predetermined analysis algorithms prestored in said electronic control means, means for selectively automatically adjusting said operating parameters at said glass forming machine and said forehearth in an iterative manner and sequence in accordance with said predetermined algorithms to correct said detected faults, and means responsive to said inspection following a delay sufficient to permit containers formed at said machine as a function of said adjusted parameters to travel on said conveyor means through said lehr to control said adjusting means.

6. The system set forth in claim 5 including a multiplicity of individual section glass forming machines each having a glass mold for forming glassware containing integral indicia identifying mold of origin, said glassware inspection means including means for reading said indicia, said electronic control means including means for coordinating said fault signals with associated molds of origin and machine sections and means for automatically controlling operating parameters at said associated machine section.

7. The system set forth in claim 5 wherein said glass forming machine comprises an electropneumatic machine including a multiplicity of air-operated operating mechanisms and electropneumaticvalve means responsive to valve control signals from said electronic control means for connecting said operating mechanisms to a source of pneumatic power, and wherein said electronic control means comprises means for selectively controlling timing and duration of said valve control signals.

8. The system set forth in claim 7 wherein said glass forming machine further comprises a multiplicity of air pressure control means coupled between said source of pneumatic power and said operating mechanisms and responsive to pressure control signals from said electronic control means, and wherein said electronic control means comprises means for selectively controlling said pressure control signals for controlling pressure of air applied to said operating mechanisms.

* * * * *